United States Patent Office 3,284,678
Patented Nov. 8, 1966

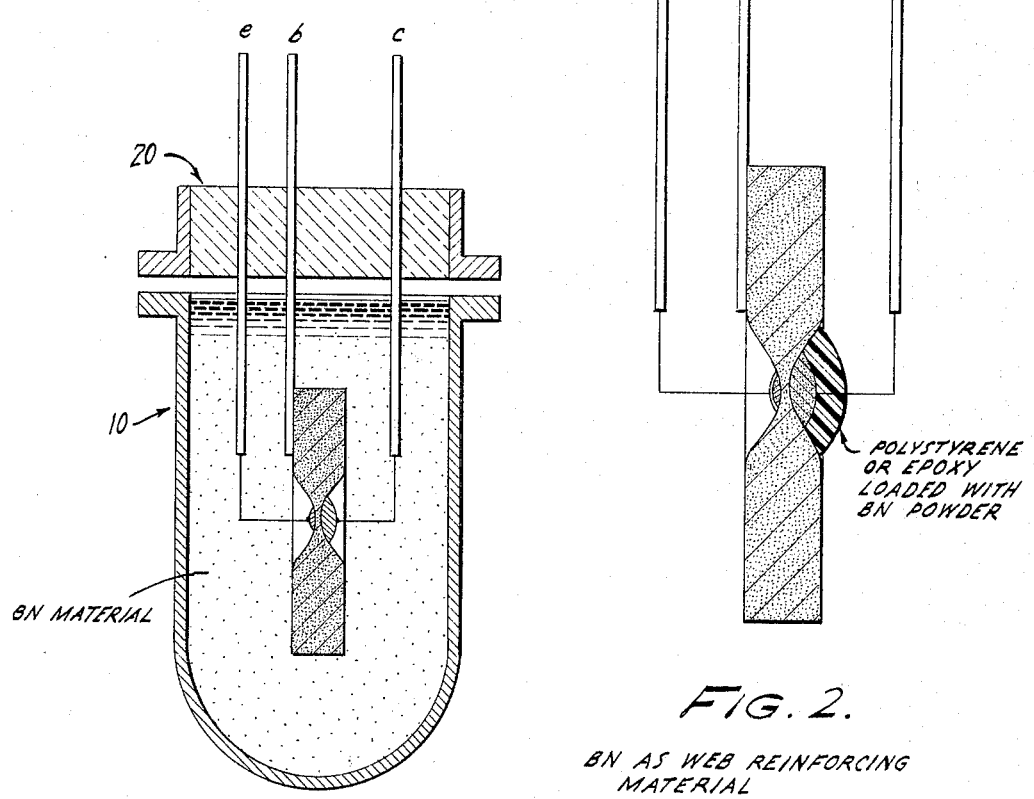

3,284,678
SEMICONDUCTOR ENCAPSULATING AND REINFORCING MATERIALS UTILIZING BORON NITRIDE
John McBride, Lansdale, Pa., assignor to Philco Corporation, Philadelphia, Pa., a corporation of Delaware
Filed Nov. 9, 1962, Ser. No. 236,562
7 Claims. (Cl. 317—235)

INTRODUCTORY—SUMMARY

This invention concerns the use of boron nitride (BN) as an environmental material for electrical devices. In its specific exemplary aspects it concerns the use of BN in a constituent in plastic semiconductor encapsulants and reinforcing agents.

Due to its superior dielectric qualities, its chemical inertness, its high thermal conductivity, as well as other specific properties, the use of BN has proved to effect remarkable and superior results when it is used as an environmental material in electronic applications. The invention is exemplified by the use of BN in a transistor potting compound (FIG. 1) and in a web reinforcing material (FIG. 2).

OBJECTS

Accordingly the objects of this invention are: (1) to provide a novel and greatly improved electrical environmental material, (2) to provide a novel and improved potting and encapsulation compound, (3) to provide a novel and improved web reinforcing material, (4) to provide novel and improved compounds for use in support, insulation, heat conduction, and protection of semiconductive materials. Other objects of the present invention will become apparent from a consideration of the following description and examples thereof.

*Example 1.—Transistor potting: FIG. 1*

Perhaps the most advantageous use of BN occurs in transistor potting applications. The superiority of potted transistors such as shown in FIG. 1 has long been demonstrated. The presence of a suitable filler material between the transistor and its case gives the entire unit greater shock resistance, stability of operating characteristics during the life of the device due to better heat conduction, and susceptibility of production in quantity while preserving uniformity and predictability of operation. In addition, the potting technique minimizes the possibility of contamination of the transistor device during fabrication and use while maintaining required standards of electrical insulation. Further details concerning advantages and techniques of potting or encapsulation may be found in Patent No. 2,857,560, to Schnable et al., granted October 21, 1958, and assigned to the assignee of the present invention.

PRIOR COMPOUNDS

Potting compounds of the past have left considerable room for improvement. Their primary disadvantage was low thermal conductivity which limited operating efficiency at increased power ratings and temperatures. Such potting compounds were usually composed of silicone oil mixed with ground silica to produce a so-called silicone grease. Modern compounds having enhanced thermal conductivity have been composed of silicone oil loaded to a putty like consistency with alumina which has been selected for optimum particle size distribution. Zinc oxide has also been used as a filler of superior thermal conductivity, but its properties are not as good as alumina. In the past transistors have been manufactured where an N-type base material is provided with an alloy or microalloy emitter and collector, so that the only sensitive surface region of the transistor was the base. These transistors were quite compatible with the silicone oil-alumina potting compound. However, when transistors having either a P-type surface or a combination of N and P sensitive surfaces were used in conjunction with the alumina potting material, the characteristics of the device would be degraded by the alumina due to its incompatibility with P-type regions.

Another difficulty with heretofore-available potting compounds has occurred in conjunction with welding of transistor case flanges. In general, if any residue of potting compound was left on the top cap flange (e.g., due to poor handling during filling), welding was ordinarily very difficult, if not impossible.

BORON NITRIDE COMPOUNDS

It has been discovered that the use of BN transistor potting compounds remarkably obviates the difficulties associated with prior compounds and yields additional novel and advantageous results.

*Thermal conductivity.*—The thermal conductivity of BN has been found to be favorably comparable to alumina and excellent for transistor device potting applications.

*Compatibility with transistor surfaces.*—BN has been found to be fully compatible with both P and N surfaces—either separately or in combination. BN potting compounds have also been found compatible with the silicon surfaces of the SPAT (Silicon Precision Alloy Transistor) devices. Both type of transistors using BN potting compounds have been recently introduced by applicants' assignee with commercial success.

*Welding.*—Another advantageous property of BN potting compounds is the fact that they do not interfere greatly with welding—as alumina did—if left on the transistor cap flange after filling.

*Desiccant.*—BN potting compounds (e.g., silicone oil with 75% by weight BN) were observed to have excellent drying properties inside transistor cans due to BN's ability to absorb moisture. BN powder has also been used alone in cold-welded transistor cans (which do not normally employ a potting compound) where it advantageously acts as a desiccant and heat conducting medium. Details of this procedure are discussed in greater detail below and in the copending application of Jerome C. Nunn, Serial No. 236,545, filed November 9, 1962, now Patent 3,241,217, granted March 22, 1966, and assigned to the present assignee.

*Other properties.*—BN's superior dielectric and insulating properties make it well-suited to potting applications. It has been found that BN does not lose its resistivity and dielectric strength at elevated temperatures. It also retains its chemical and mechanical stability at temperatures up to 5400° F. in an inert atmosphere, and up to 1300° F. in an oxidizing atmosphere. BN is a semisoft material, available in the form of a slippery white powder having a graphite-like molecular structure and a density of about 2.2. This property makes it easier to work with than other, comparatively hard materials (such as alumina) which are used in similar applications.

CASE 1.—BN WITH SILICONE VEHICLE

One example of a preferred BN plotting compound is BN powder with a desirable particle size distribution dispersed in a dimethyl silicone fluid such as Dow Corning 200 oil, or a similar fluid containing equal or better properties. The quantity of BN dispersed should be the greatest volume of particles possible to obtain the best thermal conductivity consistent with obtaining a potting material with practical dispensing characteristics. If the rheological characteristics of available BN powder are found to be undesirable due to an excessive percentage of extremely fine particles, a repetitive sedimentation process whereby the upper part of the liquid in a suspension of BN particles in trichloroethylene is leached off after a short settling time will yield powder with better characteristics. The most desirable BN potting compound was obtained when the BN powder constituted from 70 to 75% by weight of the silicone oil mixture. As the weight percentage of BN powder in the compound is increased the viscosity usually impairs conduction of heat away from the transistor due to the inability of the stiffer compound to flow into the small crevices in the vicinity of the junction area.

CASE 2.—BN POWDER ALONE—DESICCANT

Another successful application for BN is where the material in powder form is used alone in cold-welded transistor cans. Cold-welded cans (in which extreme pressure alone is used to unite bottom and top flanges) do not normally employ a potting compound since no weld flash or vapors which might degrade the transistor are produced in the cold-welding operation. However stability problems are usually encountered in conjunction with transistors fabricated in cold-welded cans due to minute amounts of moisture left in the cans. When the BN powder is used in such cans in the manner to be discussed it acts as a desiccant and heat conducting medium, and imparts a high degree of stability to the enclosed devices.

The most effective method of utilizing the desiccant properties of BN is the so-called hot sealing technique. The top caps 10 are filled to about ⅓ of their volume with BN powder and baked under vacuum conditions at 190° C. for sixteen hours. The transistor stem assemblies 20 are baked in accordance with the transistor schedule which will typically be 140° C. for one hour. After the top caps 10 and transistor stems 20 are removed from their respective vacuum ovens they are maintained on 200° C. hot plates inside the sealing chamber, with cold welding being accomplished before the assembly has had a chance to cool. The dry box in which the sealing occurs contains a very low moisture content, typically less than five parts per million. It is believed that the BN powder is in substantial moisture equilibrium with the interior of the dry box at approximately 200° C. just before cold-welding. Therefore the interior of the encapsulated unit would be expected to have an effective five parts per million water vapor content at 200° C. At any lower temperature the BN will take up more moisture and the equivalent atmosphere will have a lower content. Since transistors are ordinarily operated at junction temperatures less than 100° C. it can be seen that the BN will getter much of the moisture on the interior of the can.

*Example 2.—Web reinforcing: FIG. 2*

Another area of use for the boron-nitride powder is in the so-called polystyrene or epoxy web reinforcing process. Since electrochemical transistors are etched until a very thing base layer of semiconductor remains, the resulting structure is extremely fragile, and devices often fracture when being dropped from the workbench to the floor or when handled. To overcome this the thin web is usually reinforced with a small drop of polystyrene or epoxy resin. With the use of this type of reinforcement it has been shown that the transistor can be repeatedly dropped onto a concrete block with very little chance of damage.

Both polystyrene and epoxy are very poor thermal conductors, however, and their use tends to degrade the thermal performance of the device. If the polystyrene or epoxy is loaded with BN powder prior to application as shown in FIG. 2, the thermal performance of the device can be restored due to the high thermal conductivity of BN.

Transistors having BN-loaded web reinforcing materials may, of course, be potted with BN-loaded compounds.

As will be obvious to those skilled in the art other analogous environmental uses for BN compounds can be foreseen. Various potting or encapsulation applications such as diodes, transformers, and capacitors could also make desirable use of the properties of BN. Other fragile electronic components, particularly other semiconductors, can be advantageously reinforced with BN compounds. Accordingly the scope of the invention is to be determined only by the language of the appended claims.

I claim:

1. In an assembly comprising a closed housing, a semiconductive device having a PN junction within said housing, and electrical insulating means provided in the space between said device and the wall of said housing, said insulating means surrounding and making intimate contact with said device and making intimate contact with the wall of said housing, the improvement wherein said insulating means includes boron nitride in an amount effective to conduct heat from said device to the wall of said housing, whereby said semiconductive device will be conductively cooled when in operation without degrading the surface of the PN junction thereof.

2. The assembly of claim 1 wherein said device comprises a transistor.

3. The assembly of claim 1 wherein said insulating means is a dimethyl silicone fluid and said boron nitride is dispersed in particulate form in said fluid.

4. The assembly of claim 1 wherein said insulating means is a plastic.

5. The assembly of claim 1 wherein said insulating means is an oil and said boron nitride is dispersed in particulate form in said oil.

6. The assembly of claim 5 wherein said oil is a silicone.

7. The assembly of claim 6 wherein said boron nitride comprises about 70 to 75 percent by weight of said silicone oil.

References Cited by the Examiner

UNITED STATES PATENTS

| | | | |
|---|---|---|---|
| 2,711,511 | 6/1955 | Pietenpol | 317—235 |
| 2,877,392 | 3/1959 | Koets | 317—234 |
| 2,928,030 | 3/1960 | Lighty | 317—234 |
| 2,946,935 | 7/1960 | Finn | 317—234 |
| 2,998,556 | 8/1961 | Pritchard | 317—234 |
| 3,050,490 | 8/1962 | Nitzsche et al. | 317—235 |

JOHN W. HUCKERT, *Primary Examiner.*

J. D. KALLAM, *Assistant Examiner.*